United States Patent [19]

Scherber

[11] Patent Number: 4,591,717

[45] Date of Patent: May 27, 1986

[54] INFRARED DETECTION

[75] Inventor: Werner Scherber, Bermatingen, Fed. Rep. of Germany

[73] Assignee: Dornier System GmbH, Friedrichshafen, Fed. Rep. of Germany

[21] Appl. No.: 604,861

[22] Filed: Apr. 27, 1984

[30] Foreign Application Priority Data

May 3, 1983 [DE] Fed. Rep. of Germany ....... 3316027

[51] Int. Cl.[4] ........................ G01J 1/00

[52] U.S. Cl. ........................ 250/338; 250/330; 250/338 SE

[58] Field of Search ............. 250/338 R, 338 SE, 342, 250/330, 332; 313/373, 380

[56] References Cited

U.S. PATENT DOCUMENTS 3,324,327 6/1967 Koda ........................ 313/380
4,097,742 6/1978 Eberhardt ........................ 250/338 SE
4,321,615 3/1982 Blackman et al. ............ 250/338 SE

FOREIGN PATENT DOCUMENTS 1051612 10/1983 U.S.S.R. ........................ 313/380

*Primary Examiner*—Janice A. Howell
*Attorney, Agent, or Firm*—Ralf H. Siegemund

[57] ABSTRACT

An infrared detector includes a vacuum tube containing a photo sensitive layer comprised of densely packed needles arranged vertically on a substrate and having been grown as metal whiskers in a porous portion of the substrate. The substrate includes a metallic layer either in contact with or insulated from the needles depending upon the mode of the detecting system. The needles may face the incoming radiation, or may face away therefrom, in which case at least part of the substrate has to be transparent to infrared radiation. The radiation is either acquired directly or through an infrared optic or through a raster or line-scanning system. Photo emission from the needles can be used either directly for the production of an image or indirectly through a scanning process. The diameter and distance of the needles is significantly smaller than the radiation band to be detected.

19 Claims, 8 Drawing Figures

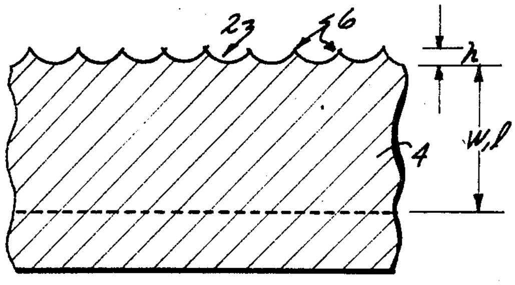
FIG. 1
PRIOR ART
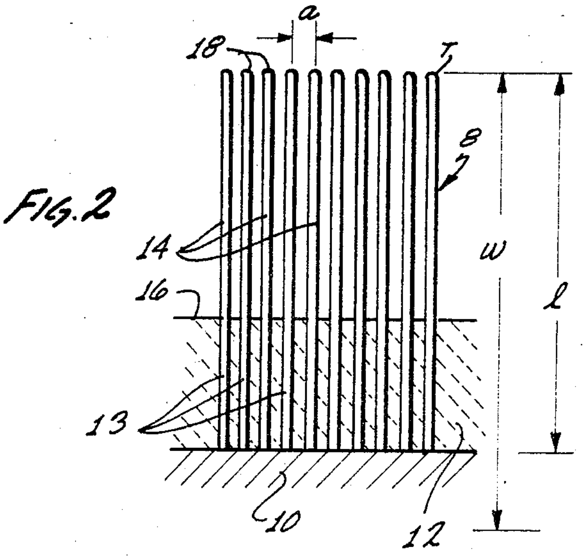
FIG. 2
FIG. 5
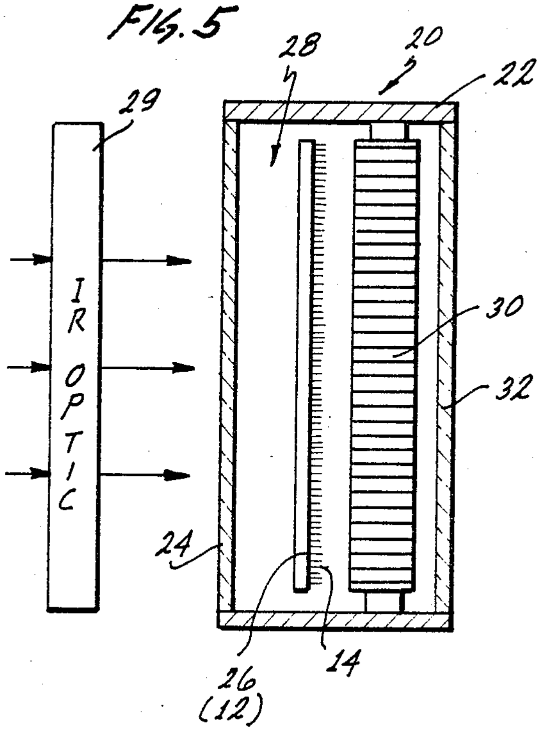
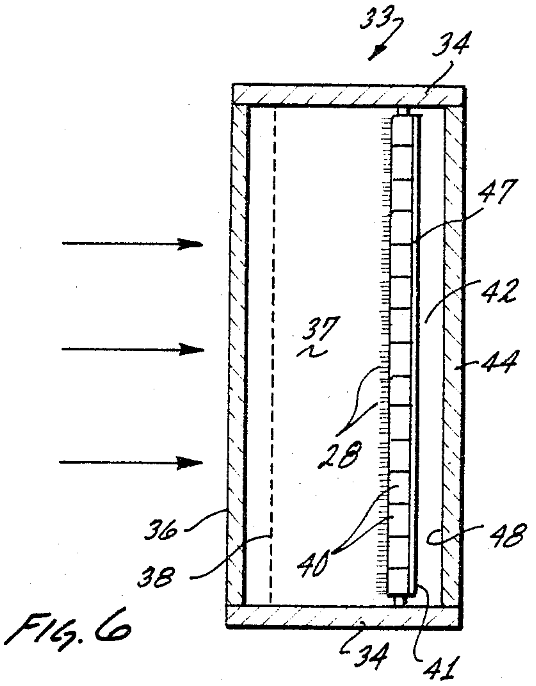
FIG. 6

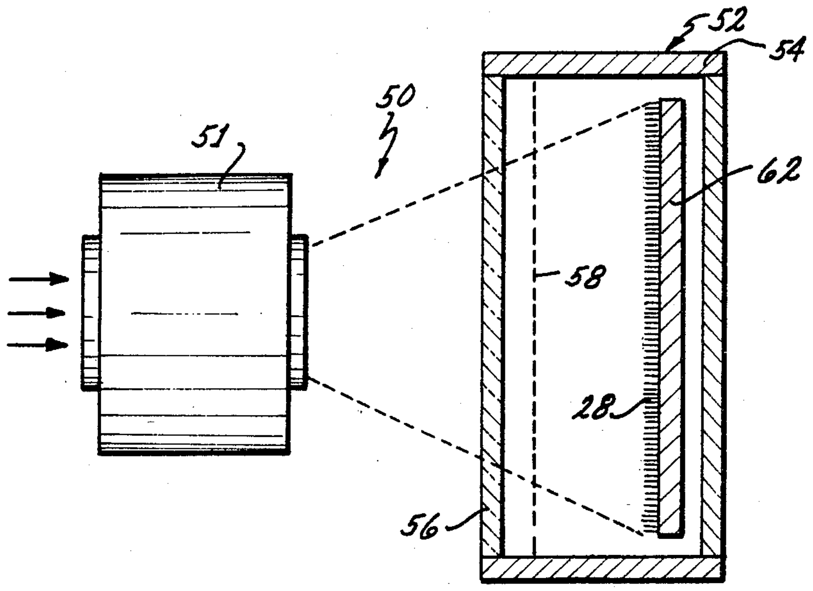
FIG. 7
FIG. 8
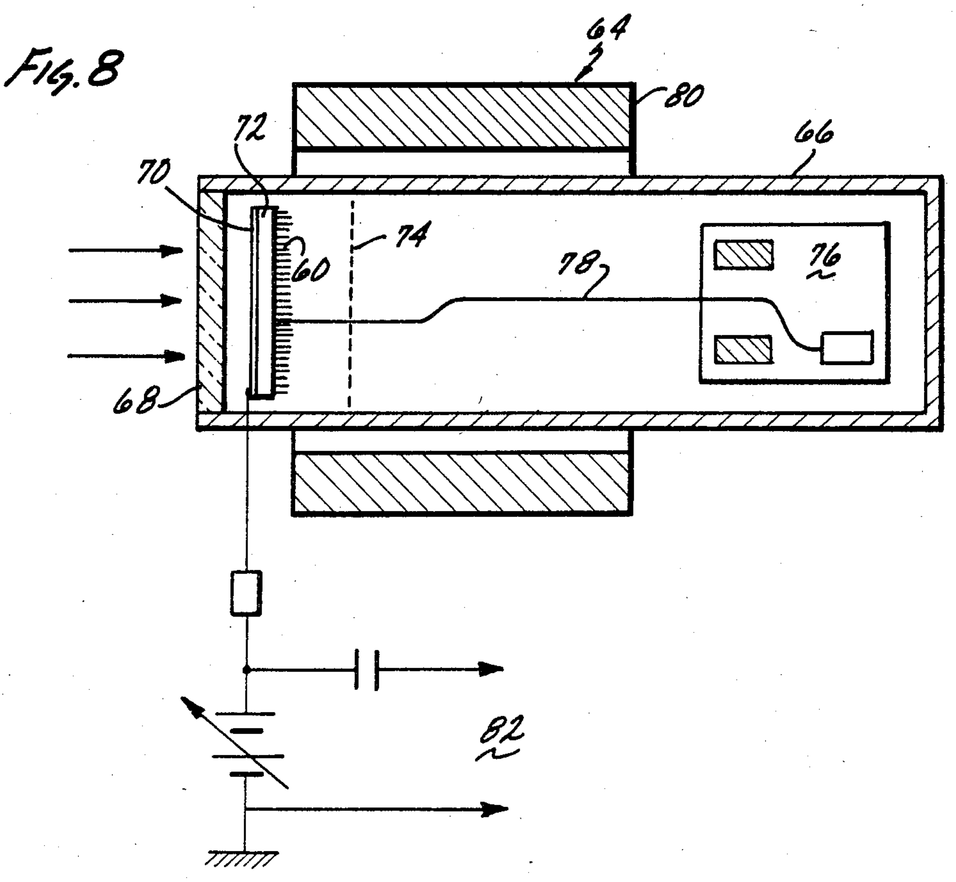

INFRARED DETECTION

BACKGROUND OF THE INVENTION

The present invention relates to a photo-electric detector particularly for the conversion of infrared radiation into an electrical signal. More particularly, the invention relates to an infrared detector which is simple to make, has extremely high geometric resolution or resolving power, very high contrast range, and a low leakage or dark current. Such a detector works usually in accordance with photo-electric field emission and is advantageous in many instances and provides particularly new fields of employment and alternative for photo cells, photo multipliers, image converters, and electron beam image tubes, such as vidicons.

Night sight viewing systems available at the present time can be placed into two categories. In accordance with the first category, residual or remaining ambient light is amplified. Devices of this kind are based on the principle of using photo-emitting surface layers, such as photo cathodes having very high sensitivity with regard to visible radiation as well as in the near infrared range covering wave lengths up to about 900 nanometers. Systems of this kind are relatively inexpensive, compact, and yield quite an adequate amount of power. However, their effectiveness is strongly interfered with by haze and fog.

The second category of so-called thermal image devices operate in frequency range from 3 to 13 micrometers, and respond particularly to the inherent radiation emanating from any and all objects on account of their temperature. Generally, this phenomenon is known as thermal radiation. Systems of this kind have an enhanced detection range and are operative also under fairly bad weather conditions. However, they require rather extensive and expensive image conversion and processing techniques. Examples here are vidicon image tubes, optical mechanical scanning, and self-scanning integrated circuits. Moreover, the sensor field has to be cooled in case it is used in connection with semiconductors.

Generally speaking it has always been the practice to shift the operation limit lamda-K of photo cathodes towards longer wave lengths. An electron emitting photo detector operating actually in the range from 1 to 2 micrometers and above would offer the following advantages:

The power output, particularly for night sight and night vision devices of the first-mentioned category would be increased, i.e., the residual light amplification would be enhanced. The photon influx of the night sky as well as the reflection of chlorophyll in plants increase drastically for wavelengths above 900 nanometers so that one can obtain images with a significant higher contrast.

The intensity of the radiation of a cloud-covered night sky at about a wave length of 1.6 micrometer is about the same as the thermal radiation of objects under normal ambient temperatures. This means that a detector which is particularly sensitive in the one to two micrometer band is not only useful as a residual light amplifier, but also as a thermal detector. Since both methods operate complimentary as far as object properties is concerned, it can readily be seen that the coupling of these two methods produces a higher information content, and a higher sensitivity so that completely new and not yet really foreseeable possibilities and feasibilities of night-sight engineering may obtain.

Detecting and acquiring radiation in the temperature radiation range by means of photo cathodes, particularly for wave length in excess of 2 micrometers, would actually entail a drastic simplification and lowering of cost of the cameras because the advantages of the two categories mentioned above can in fact be combined in a mutually reinforcing fashion so that one may even speak of synergism. The simplification is particularly very the result of the fact that released photo-electrons can be used immediately and directly for the production of an image on a video screen, such as is the practice, for example, in so-called cascade tubes or in multi-micro channel tubes.

Thus far the advantages offered above are merely the result of a hypothetical situation and of speculation concerning the realization of an extension of the effective wave length range. In the past, certain proposals have been made for extending the detection range of photo cathodes to above 1 micrometer. The problem should be considered in some detail. In the case of photo-electron emission, the incoming photons must have a quantum energy $hv_k$ which is larger than or equal to the electron work function in order the photo effect, i.e., the work function is a physical constant for the particular material and is therefore decisive for the limit frequency $v_k$, and the limit wave length $lamda_k$ which is equal to $c/v_k$ wherein c is the velocity of light. In the case of semi-conductors the situation is somewhat modified because the fermi level is not occupied. In the case of a P-type semi-conductor in which only the valence band is filed with electrons, a photo-electron must have a minimum energy which is the sum of the band spacing and of the electron affinity, otherwise emission is not possible. The work function of most metals is about 4.5 electron volts, which corresponds to a limit wave length lamda k of about of about 0.28 micrometers. That of course means that ultra-violet light is necessary in order to release photo electrons.

The known photo cathodes have a work function which has been lowered through suitable surface treatment, such as coating the electrode carrier with cesium or a cesium compound. This way one may be able to reduce the work function to about 1 electron volts. Accordingly, such a photo cathode is sensitive, not only to visible light, but also to infrared radiation of frequencies below the visible light spectrum. Further reduction of the work function has been carried out primarily through two methods: These are called the NEA method and the field assisted photo emission.

In the case of the NEA method (negative electron affinity, Journal of Electron-Materials Vol. 3, No. 9, 1974 by means of strong bending of the band edges due succeeds that the vacuum level $E_{vac}$ is lowered below the conduction band edges $E_L$. The electron affinity is the difference between these two values, i.e. ($E_a=E_{vac}-E_L$) and this difference is rendered negative so that the electrons which were to occupy the conduction band can in fact leave the solid. Even though such NEA cathodes are known for 20 years, and even though laboratory tests produced quite a good quantum yield, the realization of this concept leaves much to be desired, particularly for reasons of manufacturing which proved to be more difficult than was anticipated. Moreover, the NEA cathodes have a principal drawback on account of the particular semi-conductor used, such as gallium-arsenide and silicon because in view of the distance between the conduction and valence bands one obtains a limit of the spectrum region, i.e., the absorption edge is near 1.12 micrometer for silicon and 0.92 micrometer for gallium-arsenide.

In the so-called field assisted photo emissions one uses the known electric point effect. This effect is characterized that a high electric field strength occurs on a sharp point or edge, and this has the effect that the potential barrier at the surface of the solid is lowerer and reduced as to width. Without an electric field, there is a step-shaped dependency of the potential energy of an electron from the distance from the metal surface, but in the presence of a strong electric field this steplike dependency is modified to a lower wall or barrier. Due to the tunnel effect, electrons may leave the solid even if the energy is smaller than the work function. In the case of metal, electrons will be emitted from states directly below the fermi level. The field electron microscope is a known, practical realization of this effect.

Photo field cathodes (PFE cathodes)) are realized in test cases under utilization of semi-conductor materials, as was reported, for example, in, IEEE Transaction on Electronic Devices Vol. 21, page 785, 1974. For this purpose one provides a plurality of points or peaks on a semi-conductor crystal made of silicon under utilization of a locally selective etching. A typical radius r of curvature of these peaks is about 100 Ångstrom. The distance between the peaks is in the vicinity of two times their height h and equals 20 micrometers. A typical and somewhat schematical example of this type is shown in FIG. 1. The ratio of the emitting surface towards the total surface is given by $r^2/h^2$, and is in this case about $2.5.10^{-8}$. In order to obtain a high sensitivity, it is desirable that not only photo electrons are produced in the immediate vicinity of the peaks and leave the surface, but a large area of the crystal should contribute to the photo current. This, however, is possible only if two rather elementary premises are fulfilled:

The penetration depth of the light must be large as compared with the height h of the peaks. Moreover, the extension and range of the photo electrons within the solid, i.e., their diffusion length, must be approximately equal to this penetration depth because electrons produced within the material are at least supposed to reach the surface. It was found that on the basis of weakly doped P-type silicon material favorable values for the penetration depth as well as for the diffused length, in the order of hundred micrometers can be obtained. One can see from this example moreover, the total photo field emission is presently realizable only on the basis of semi-transparent semi-conductor material. The penetration depth of light in metal is however much more limited, particularly in view of the high electron density, this penetration depth is usually not more than 1/10th of the respective wave length so that metal structures of the type shown in FIG. 1 will in fact be photo sensitive only in the immediate vicinity of the peaks, and this in turn means that the detector sensitivity measured in relation to the total surface is very small indeed.

The known semi-conductor photo field emitters are encumbered by a number of rather serious disadvantages which in fact may render questionable any such successful employment for infrared cathodic photo detection. The finite band spacing of the semi-conductor results in a limit wave length which is in fact quite similar to those of the NEA cathodes, and even of the conventional photo cathodes. The activation of photo electrons in the entire surface area between the peaks which is absolutely necessary in order to obtain a sufficiently high quantum yield has undesirable and even unavoidable side effects: One produces a very high dark current on account of the thermal excitation of surface states which are always present. In view of the large diffusion lengths, and in further view of the field effect, the thermally produced electrons will reach the peak area with a probability of nearly 100% and thus simulate the effect produced by photo electrons. These thermally produced electrons will therefore be emitted analogously. This means that a satisfactory operation of such semi-conductor cathode is possible only if it is very strongly cooled in order to eliminate this parasitic thermal effect.

DESCRIPTION OF THE INVENTION

It is an object of the present invention to provide a new and improved photo detector for infrared radiation having adequate sensitivity at wave lengths above one micrometer, and having a high quantum yield, low dark current, and is easy to make even if any detector surface is to be curved. Moreover, such a detector should be amenable to working at high operating temperature without requiring cooling, remains stable in the environment, does not require cesium surface treatment and has a long life.

It is therefore a specific object of the present invention to provide a new and improved detector for converting infrared radiation into an electrical signal under utilization of a photo sensitive layer disposed in a vacuum tube and which permits response to incoming radiation under development of electrons emitted from peaks to points.

In accordance with the preferred embodiment of the present invention, it is suggested to provide a photo sensitive layer to be comprised of a plurality of densely packed metal, electrically conductive needles arranged in vertical alignment on a substrate, and having a diameter as well as an axial distance which is at least one order below the wave length to be detected, such measurement to be understood on a metric scale. The needles have preferably grown as whiskers in a porous carrier from which they project. The porous carrier is preferably an oxide layer which has been anodically deposited on a metal substrate.

In furtherance of the invention the substrate under the carrier should be electrically conductive and should have galvanic ohmic, i.e., conductive contact with the needles. Alternatively, however, there may be no electrical conductive contact, but a barrier layer may be interposed. The porous carrier layer can be configured to accommodate either case.

The needles may face the oncoming radiation or face away therefrom. In the latter case, the respective substrate should be permeable and transparent to the radiation to be detected.

Preferably by means of optical equipment the object field is imaged either through the transparent layer onto the principal detector layer or directly thereon. The electrons produced through the photo field emission will directly or indirectly (i.e., under operation of secondary electron multiplication) impinge upon a screen in order to render the object visible. The image or object field of view may be reproduced in toto, i.e., synchronously or it may be line or raster scanned and reconstituted. The photo emission from the needle may be used in toto for image production in a parallel fashion or serially through electron beam scanning.

Photo sensitive needles on metallic substrates may be composed as discrete elements, and they are disposed on a common highly insulating substrate. The object field in this case may be imaged by means of an infrared optical system from the front upon the sensor fields, and these sensor fields are charged through photo-field electron emission so as to produce discharges in their back and in a gas-filled space, having a counter electrode so as to be able to produce a gas discharge for rendering the object visible in that fashion.

Alternatively the photo-sensitive layer is provided on a metallic substrate and by means of an opto-mechanical scanning system, the object field is scanned in a line pattern or in a matrix pattern and imaged upon the photo-sensitive field, and a video signal is produced through photo-field electron emission which video signal is rendered visible under utilization of a signal processor and monitor.

In case photo-sensitive needles and substrate are separated through a barrier layer, it is suggested to provided a particular substrate which is permeable to the radiation passing through and by means of an infrared optic system, the object field is imaged through this layer upon the photo-sensitive layer which provides photo field electron emission and charges the layer; the charge distribution is scanned by means of an electron beam and extinguished again and a video signal is produced accordingly.

In still another version, the substrate is metallic and faces the infrared image; the needles face an electron multiplier array, which in turn excites a video screen.

Considering the basic aspect the invention in some detail it must be realized that the transport of photo electrons to the respective needle peaks (whisker structure) is basically different from the transport of photoelectrons in microscopic semi-conductor crystals. Since there is no band gap in metals, the life of the photo-electron is very much reduced, i.e., it relaxes in a short period of time, and discharges its entire exitation energy into the crystal and lattice structure until equilibrium with the remaining electrons has been restored. The medium free path length moreover is limited by the slender shape of the needle to a typical value of about a hundred Ångstroms. The average energy loss per scattering event of the electrons at a crystal lattice atom or at the surface is about 0.01 electron volts at room temperature. In the case of infrared radiation having a wave length of, for example, two micrometer, a quantum energy of 0.62 electron volts is involved and the electron will receive approximately 60 impacts until its thermal equilibrium with the electron population is restored. Moreover, the electron will have traveled during this period over a path length of about 0.6 micrometers. Since the absorption length for a two micrometer radiation within the needle structure is likewise in the order of 1 micrometer a significant amount of the "hot" electrons will in fact reach the peak area and here it will be "sucked" away from the external field. Electron-electron impacts can be neglected under these circumstances.

It is believed on the basis of present day knowledge that the emission property of the needle structure used in accordance with the invention may exhibit also a different effect. which is particularly significant for image conversion and production purposes. The portion of the electrons which enter into equilibrium with the remaining electron population without reaching any of the needle peaks will yield its entire energy over and above the equilibrium energy to the metal lattice which will be heated accordingly. With increasing temperature the number of electrons in a given energy interval above the medium electron energy will increase. This effect extends or widens the fermi energy distribution. The thus thermally excited electrons have an increased probability of tunneling through the potential barrier, which means that the overall emission current will increase.

It can readily be seen that the total emission current is composed of two components, one, the directly emitted photo electrons (photo emission) and the other component includes those electrons which are indirectly emitted through the aforementioned heating process; these then are thermally emitted electrons. This combination emission produces a high radiation sensitivity. The relative proportion of the two types of emission can be controlled through proper dimensioning of the structure involved, through the choice or materials employed and through the operating temperature. Therefore, the ratio of these two components or their relative contribution can be matched rather closely to the existing probem. The optic emission is of course of advantage, particularly for a fast response, while the thermally induced emission is of advantage because there is an inherent storage and accumulation effect involved, which is of particular advantage for image production with mechanical or electronic scanning.

The particularized micro-structure permits combining of a number of rather advantageous effects. One may for example increase the penetration depth of the light. In the case of compact metal, this penetration depth is less than one-tenth of the wave length, but the particular structure involved here permits for example variation in packing density of the needles and also through appropriate choice of the metal one can in fact increase the penetration depth to a multiple of the wave lengths involved.

The metal micro structure provides highly efficient light absorption, which means that reflection losses can in fact be neglected. This compares favorable with semi-conductor PFE cathodes which experience a loss of about 30%.

The absorption of the incident radiation is an areal one, even though the cross-section areal of the needles is in fact only a fraction, i.e., less than one-half, even as low as one-tenth of the overall surface area. Since the structure elements are very much smaller than the wave length involved, the absorption is not carried out in accordance with the rules of geometric optic, but under utilization of a process which can be described as a coherent scattering and absorption phenomenon. Therefore, the condition experienced in macroscopic semiconductor PFE cathodes, which is rather trivial in requiring that even the valleys between the peaks must contribute to the photo effect is no longer of any interest.

Contrary to semi-conductors, metals do not have gaps in their energy band structure which has to be overcome through photo excitation. This then means there is no cut-off condition, i.e., there is no limit wave length lamda-k. The utilization of metal crystallites in lieu of extremely pure and perfect semi-conductor crystals is of course of great significance as far as manufacturing is concerned; the manufacture is considerably simple, particularly if the chemical coating method described below is used. This way one can provide large area cathodes, and one may even provide curved cathodes without any problem. The method moreover permits the like of materials which remain stable in operation and under a large variety of ambient conditions. Moreover, one can control the operating characteristics through proper selection of the band structure of the metals, as well as through appropriate choice in the geometry of the needles.

The dark current characteristic is considerably better in the case of metal whiskers as compared with PFE semi-conductor cathodes because in view of the missing band gap metals do not exhibit the phenomenon described as surface states, nor do they show a large diffusion length.

The dark current of the photo cathodes made in accordance with the invention is exclusively determined by the outer field at constant operating temperature. Therefore, through operation of the appropriate "drawing" voltage or an auxiliary voltage, one can provide rather fine tuning towards optimized low levels of the dark current. Since there is neither a cutoff condition as in energy levels for reasons mentioned above, and since the reflection losses are practically not existing, the incident photons can be acquired through optical and thermal excitation under maximum quantum yield. The sensitivity threshold is only limited through noise, which is inherent in the physical phenomenon involved.

The surface resolution or resolving power of a metal structure cathode as per the invention is significantly higher as compared with conventional detectors using elements such as photo diode arrays PFE semi-conductor cathodes or polycrystalline layers. Since, as stated, the needles are spaced from each other at a distance much less than the wave length of the radiation to be detected, this detector actually obtains a resolution which is considerably better than the resolution obtainable by optical imaging. In "real" system the resolution is usually limited through other components, but this particular microscopic characteristic of the needle structure is therefore particularly advantaged.

The foregoing phenomenon is to be explained in greater detail in relation and in conjunction with a vidicon tube. The electron beam of present-day vidicon tubes has a diameter at the sensor layer (retina), which is typically about 35 micrometer. On the other hand, the needle diameter of the layer structure as per the invention is only 0.01 micrometer. Therefore, an image point is actually produced by the composite effect of about one million adjoining peak emitters. This therefore will provide a very advantageous averaging effect of any variations in emission of the peaks themselves. These variations are inevitable and depend on the material and on the method of making the needles. Moreover, the current load of the whiskers is reduced to a tolerable range in the pico-ampere range so that heating, or even burning, of the needle peaks will not occur.

In furtherance of the invention, an oxide layer is deposited by anodic oxidation on a substrate, the layer having vertically oriented pores and metallic whiskers are grown in the pores so as to extend beyond the oxide layer.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1 is a cross-section through a photo-field emitter in accordance with the state of the art.

FIG. 2 is a cross-section through a photo-sensitive layer in a photo detector made in accordance with the preferred embodiment of the present invention for practicing the best mode thereof.

FIGS. 5 and 6 illustrate two photo-detectors in accordance with the invention, as image converting elements;

FIGS. 7 and 8 illustrate two detecting systems using photo-detectors made in accordance with the preferred embodiment and including scanning facilities; and wherein FIGS. 5 and 8 use radiation from the rear and FIGS. 6 and 7 use radiation from the front as far as the needle orientation is concerned.

Proceeding now to the detailed description of the drawings, FIG. 1 illustrates a cross-section through a photo-sensitive layer of a semi-conductor photo-field emitter 2 in accordance with the state of the art. A semi-conductor crystal 4 was doped and through selective etching a plurality of peaks 6 were produced having a height h of about 10 micrometer. The typical radius of curvature of the peaks is about 100 Ångstroms, and the distance between the peaks is about twice that of the height, i.e., about 10 micrometer. The absorption length W corresponds in practice to the penetration depth of the radiation, and is about 100 micrometer long. This is about equal to the diffusion length l, i.e., which constitutes the range of released photo-electrons. This here is merely a summary of the device of the type of the prior art, details of the drawbacks of such a device have been described above in the introduction to this specification.

FIG. 2 now illustrates a cross-section through a photo-cathode made in accordance with the preferred embodiment of the present invention to provide a new and improved photo detector. Reference numeral 10 refers to a base or substrate made e.g. of metal such as aluminum. This metal layer carries a porous oxide mask 12 having elongated pores, or ducts 13 in which were precipitated whiskers or needles 14 which extend above the oxide layer surface 16. The needles have peaks 18. Typical and rather favorable values are the following:

Figure 3:
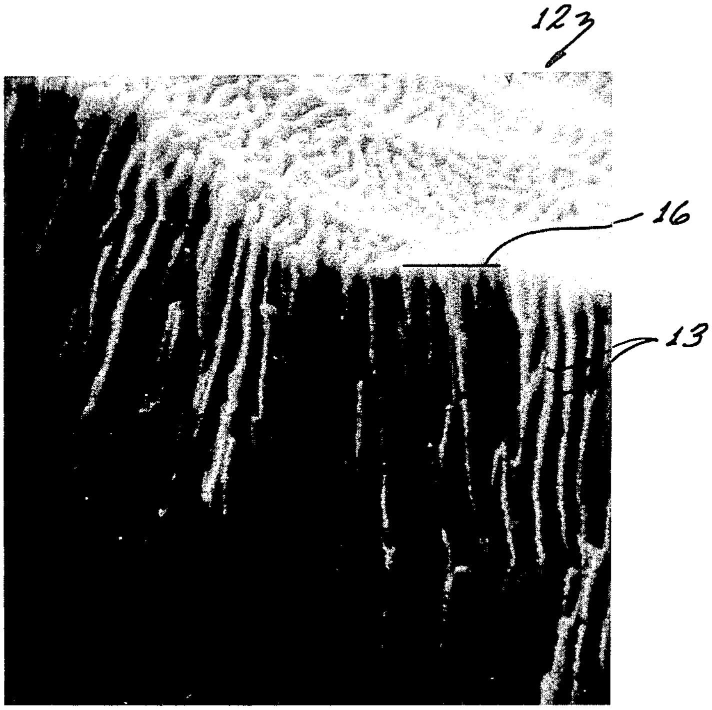
FIGS. 3 and 4 illustrate electron-microscope images of photo-sensitive layers made in accordance with the preferred embodiment.

The layer 12 should be about 0.1 to 0.3 micrometer thick. The pore or channel distance a should be between 300 and 600 Ångstroms. The uncompressed pore diameter is between 200 and 400 Ångstroms. The length of the needles l or little whiskers 14 is about 1 micrometer; their diameter is between 100 and 200 Ångstroms, and the radius at the peaks 18 is about 50 Ångstroms.

Under such conditions an absorption length w obtains to be about 1 to 2 micrometers. The condition that w is larger than l is particularly meaningful in case substrate 10 is made of metal. The metallic needles 14 therefore engage and contact in the illustrated embodiment the substrate metal 10. The particular structure can be utilized directly as photo-emitting cathodes. Usually a barrier layer is set up after oxidation and between whiskers 14 and metal 10. However, this barrier layer has been removed so that the needles 14 make directly conductive (galvanic, ohmic) contact with the conductive, metal substrate 10. A selective removal of the barrier layer can be provided through anodic etching in a non-oxidizing acid which wll attack the substrate 10 only weakly or not at all. This will be described more fully below.

In cases, however, it may be desirable to retain the oxide barrier layer. This will be particularly the case if the structure as per the invention is to be used as photo-sensitive retina in a vidicon tube. Not only is it desirable in such a case to have a barrier layer, but the layer should be enhanced. The purpose thereof is that the needles 14 will establish a plurality of capacitor plates, vis-a-vis the metallic substrate 10. These multiple capacitors will be charged upon incidence of photons, and on account of the electron emission the needles will be positively charged relative to the substrate 10.

In the following the method of manufacture will be described. Utilization of the illustrated structure as areal emitter or as image converting structure requires that the geometry of the needles, i.e., their height, the radius at the respective apex, or peak, and the lateral distance between the needles should be as uniform as possible. This appears to be quite difficult to obtain, but it was found that the task can be accomplished in a relatively simple electro-chemical method to be carried out in two steps as will be described next.

In the first step one provides a suitable conductive substrate, and through anodic oxidation a thin porous oxide layer is produced. In the second step one provides metallic "seeds" in a galvanic, i.e., electro-plating-like process inside of the pores or cells of the oxide. These seeds will be caused to grow in the form of whiskers and will project beyond the surface of this oxide layer. This method of growning whiskers is known per se, for example, through German printed patent application 2,616,662 and 2,705,337. The method as employed there for the manufacture of solar radiation absorbing coatings. The method however, is novel with regard to the manufacture of infrared detectors and requires consideration of unique aspects.

In particular and as far as the first step is concerned, a porous oxide mask is produced. In order to optimize the configuration of that mask one should fulfill a variety of conditions with regard to the substrate. Moreover the used electrolyte and the anodizing parameters generally must likewise fulfill certain conditions.

The substrate should be made of metal which through the process of anodization is capable of providing dense, firmly adhering and electrically insulating surface oxides. For example, aluminum, magnesium, titanium, tin, tantalum and zirconium fulfill these requirements.

In order to provide a layer pattern which is free from defects as much as possible, impurities, surface defects, and gross texture defects and flaws are to be avoided. Ideally of course one should have available a single crystal. However, polycrystalline material are in many instances adequate and sufficient for obtaining a sufficiently homogeneous covering layer because the metal grain structure of the substrate does not necessarily continue into the oxide layer.

Photo cathodes for electron beam imaging tubes are preferably operated in a transmission mode, i.e. their radiation impinges upon the back upon the photo-sensitive layer so that the substrate must be permeable and transparent to that radiation, and it must also carry an electrically conductive electrode. A suitable substrate in this instance will be single-crystal silicone or germanium.

The electrolyte, i.e., the electrolytic liquid used for growing the whiskers must contain at least one oxygen releasing compound. Preferably a watery solutions of sulfuric acid, phosphoric acid, tartaric acid, or appropriate salt solutions or alcohol. These liquids are indeed capable of forming an oxide layer. On the other hand, the electrolytic liquid should have at least some capability of providing solubility of the oxide whenever subjected to an anodic field. Upon appropriately adjusting these parameters, i.e., the two mechanisms, precipitation and back-solution, one can obtain an oxide layer of 0.5 micrometer thickness or thicker which does indeed exhibit a uniform distribution of cylindrically shaped pores. These pores are to be considered as current paths, which permit a continuous progression of the oxide-metal interface towards the substrate. A strong process of back-solving or resolving the oxide occurs in the pores during the anodization process. A thin oxide skin forms and remains in the bottom of the pores which will constitute the barrier layer mentioned above having several nanometer thickness. This layer is comparable to the thin anodic oxide skin which is produced in an electrolyte which does not exhibit reverse solution, and having a thickness that grows in proportion to the voltage.

The anodization method as described is known per se and is practiced in certain coating techniques such as electrically dying of aluminum compounds and components. One can use these known methods with advantage for the formation of the oxide mask in accordance with the invention because the pore structure produced was found to be very homogeneous and reproduceable. Of course in principle the effect and operation of an electrolyte has a certain aspect of unpredictability. However, for a given system composed of a particular electrolyte and a particular substrate, pore diameter oxide thickness and pore distance can be adjusted in a controlled fashion through appropriate selection of temperature, concentration of the electrolyte, and density of the electric current passing through.

The inventive method includes, as was outlined above, a second step. Pursuant to this second step, the metal whiskers are grown. For this an electrolytic liquid is used which contains a metal salt, and through precipitation whiskers are grown beginning at the bottom of the pores made in accordance with the first step outlined above. There is a certain similarity to the electrolytic dieing of anodic $Al_2O_3$ layers. However, there is a significant difference here which is to be seen in that the metal structure to be produced in accordance with the invention will ultimately project beyond the thin oxide skin while the known method provides for embedment of metal pigments in relatively thick oxide.

It was found to be of advantage to use particular metals for the growth of the whiskers and needles. These metals are nickel, cobalt, iron, maganese, and chromium. During electro chemical crystallization, they do indeed exhibit growth in a column, i.e. whisker or needle-like configuration, and they have a relatively high lattice stability with repsect to thermal and electrical loads. The strength and height of the metal needles can be controlled to some extent through the parameters determining the precipitation process, particularly the intensity and rate of that process. Of course the oxide pore structure has a high influence upon the growth process.

The following is a specific example for making a photo-sensitive layer using a substrate of pure aluminum. The substrate is first degreased in the usual manner under utilization of organic or alkali solvents by means of which any greasy substance can be removed. Subsequently this cleaned aluminum substrate is pickled for five minutes in a 5% caustic soda solution at 60 degrees centigrade, following which the aluminum piece is flushed with water and briefly dipped at room temperature into a 10% nitric acid solution following which the piece is again rinsed clean. After this pretreatment the oxide layer is grown in a bath of 10% phosphoric acid at a bath temperature of 18 degrees centigrade, using an alternating voltage of 16 volts. It took about 20 minutes to grow the requisite oxide layer. After an intermediate flushing, rinsing, and cleaning process, the barrier layer was etched under utilization of a solution of 60 grams per liter $MgCl_2$ and under further utilization of a 6 volt ac voltage lasting for a few minutes following which there is a thorough cleaning in water.

The metal structure was then produced in a bath of 70 grams per liter $NiSO_4.6H_2O$ and 20 grams per liter boric acid at room temperature under utilization of an alternating voltage of 12 volts. The growth period was about 15 minutes. After careful flushing and rinsing in the cascade, wherein at least the final cleaning step lasts 10 minutes in flowing de-ionized water, the layer was dried in slightly warmed air and preferably immediately stored in vacuum for further working such as sealing.

FIG. 3 illustrates a raster electron microscope (REM) photographic image of an oxide mask such as 12 and made in a manner as described. The pore channels 13 has been enlarged however through etching in order to render them better recognizable in the picture. The enlargement is 24,000 fold. One can readily see that there is a multiple of pores 13 which are all oriented perpendicularly to the surface 16 of the oxide layer.

Figure 4:
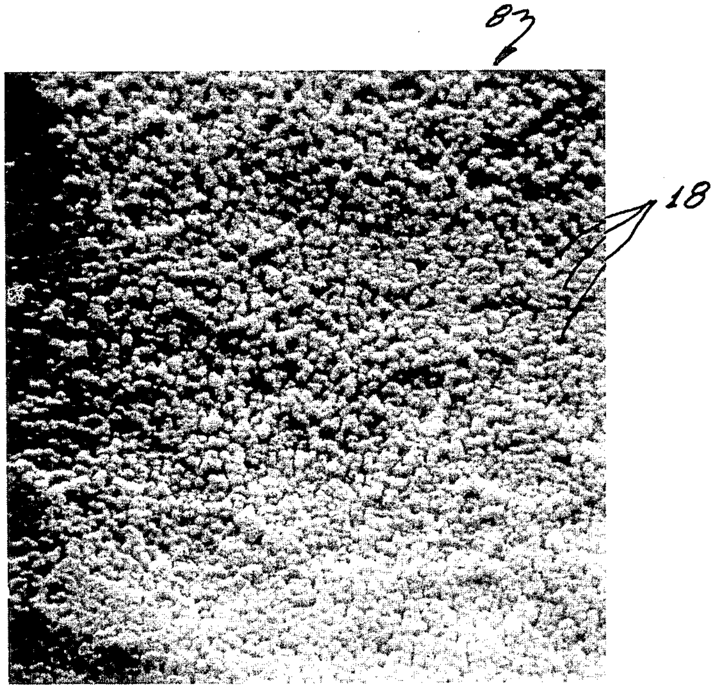

FIG. 4 illustrates analogously an REM photograph of a completely grown metal structure-type photo cathode 8 in top elevation and at a 20,000 fold enlargement. Simply for purposes of rendering the needles better recognizable in this test picture, they were covered at the surface with a thin gold layer. This way one produces a wooden-match-headlike, round configuration of the peaks of the needles which normally are in fact pointed. The figure illustrates very clearly a rug or carpetlike structure formed through the multiple juxtaposed whiskers 14.

FIG. 5 illustrates a photo detector 20 made in accordance with the invention and configured as image converter device with secondary electron multiplication and imaging screen. A vacuum-tube-like housing 22 is provided with a infrared window 24, and an infrared transparent substrate 26 is situated in the housing supporting the oxide mask 12 which in turn carries the needles 14. All of these elements establish the photosensitive layer 28 and are arranged in that sequence in the direction of incoming radiation from the left. The device further includes a multi-microchannel amplifier 30, and a monitor screen 32.

An object field will be imaged by means of a suitable optical lens, device or the like 29, upon the photo cathodes 28 having the transparent substrate 26. Just as in the case of conventional residual light amplifiers the secondary electron multiplier 30 is connected to have anode potential. The accelerated and increased or enhanced electron stream thus hits the video screen 32. The resulting image can be observed directly or by means of a light fiber structure, light amplifier tube or by other electronic means and may be further processed to provide data acquisition at the appropriate scale.

FIG. 6 illustrates a photo detector 33 for carrying out an image conversion method which is novel per se. In this case, the operation of the photo cathode made in accordance with the invention is directly coupled to a plasma or discharge like indicating device. A vacuum-sealed fitting in casing or housing 34 is provided with an infrared window 36, an anode cavity 37, a grid-like anode 38, and a photo cathode 40 as per the present invention. These elements are arranged in the stated sequence as seen in the direction of incident radiation. The photo cathode is again comprised of a photosensitive layer 28 of the type outlined above and includes a metallic substrate which is partitioned into elements 40 which are insulated in relation to each other and are carried by an insulating layer 41. In addition, there is provided a plasma gas cavity 42, window 44 having an electrically conductive coating 48.

In this example photo cathode 40 is configured as a multi-element detector field. The detector elements are insulated in relation to each other electrically as well as against the plasma cavity 42. The insulation is provided by the layer 41. The detector elements have a size of approximately 1 millimeter square. The partitioning (40) thus defines image elements which, on the one hand, average the detection of a relatively large number of needles, but the size of the elements should remain sufficiently small in order to define adequate adequate visual resolution. The photo-sensitive layer 28 of each detector field is oriented towards the object and, as stated, faces a grid anode 38. The gas-filled cavity 42 is arranged on the back side of the detector field and is limited by the window 44 which carries an electrically conductive but transparent coating 48. This coating 48 functions as a counter electrode of the plasma.

The anode cavity 37 is evacuated and gas is contained in the plasma cavity 42 at a rather low pressure, such as, for example, 0.1 millibars. A voltage is applied between the anode 38 and the counter electrode 48, which voltage is composed of a dc component upon which is superimposed an alternating voltage. The detector elements 40, etc., are not connected to anything. The dc potential is adjusted just as in the other examples, such that the dark current is very low. The alternating voltage component has the function to maintain the potential of the detectors 40 near the potential of the counter-electrode 48 as long as radiation is not incident. This is easily made possible through adjustment of the different distances involved and owing to the dielectric properties of the detector substrate.

If radiation reaches a detector element, it yields electrons and is charged positively. Thus the potential difference in relation to the potential of the counter-electrode 48 is increased and the ignition or firming voltage of the plasma is exceeded. The plasma discharges and, therefore, reduces the internal resistance within the chamber 42. This of course causes the plasma to extinguish again unless the radiation continues to be incident.

The operation described above, as far as this element 40 is concerned, is comparatively simple. However, certain more sophisticated modes of operation are feasible analogous to the known plasma panels, wherein, for example, a storage operation is provided for with superimposed pulses and alternating operation under continuous recharging of the detector elements through the IR radiation following discharge through plasma excitation.

FIG. 7 illustrates a camera system 50 using a photo detector 52 in accordance with the invention, and employing particularly scanning on the side of the detector. A mechanical scanning system 51 is placed in front of the photo detector 52, which mechanical scanning system provides for optical scanning under mechanical principles. The photo detector 52 is comprised of a vacuum-sealed housing or casing 54, an IR window 56, a grid anode 58, and the photo-sensitive layer 28 (whiskers projecting from an oxide layer) disposed on a metal substrate 62.

The optic-mechanical scanning system operates as a raster or a line scan system, and this system 51 provides the radiation of an object field to the detector field 28. However, this transfer is not carried out on a simultaneous or synchronized basis as far as optical imaging is concerned, but is carried out such that only a small portion of the field of view is run across the detector field 28 in any instant. This way signals representing the object field are serially presented by the detector field 28, and can be acquired by means of a suitable signal processor which in turn restores an image on a suitable monitor.

Many variations of this scanning principle are known per se and the principles do not have to be repeated here because they are appropriately applicable to the present method, particularly they are suitable for employment of the detector field 28. Herein one may use object scanning, line scanning, raster scanning or the like as is well known per se and the novel detector can readily be used in these instances. The detector-type scanning as illustrated is particularly suitable for employment of the inventive sensor layer because as will be appreciated from the description above, detector fields of the type 28 can be made in large areas without loss in homogeneity. Moreover the particular structure offers the advantage that there is a nearly unlimited geometric resolution below the resolution of any optical system that is employed. Also, the sensor layer 28 can be made on a metallic substrate 62 in a manner described which is indeed quite a simple mode of manufacturing. As compared with conventional serial detectors, there is the added advantage that integrated multiplex circuitry is not needed, and the camera 50 is in fact quite simple from the point of view of optics as well as from the point of view of mechanical construction.

FIG. 8 illustrates a detection system 64 of the vidicon image type, i.e., it operates under utilization of electron beam scanning. In this case then, the inventive photodetector layer is used as a retina, still having from a general point of view the function of a photo cathode. This particular imaging tube 64 is constructed as follows:

There is a vacuum sealed casing 66 which is provided with an infrared window 68 through which light or infrared radiation is received and passed into the interior of the casing 66. Inside the casing and behind the window 68 there is provided the electrically conductive backside 70 of a high ohmic (resistive) optically transparent substrate 72 which, on its front side, carries the inventive light sensitive layer 60 functioning as a photo cathode. This photo cathode 60 faces a grid-like anode 74. Still behind this arrangement there is provided a device 76 for the generation of a scanning electron beam 78. The tube 64 is contained, so to speak, within the known electron beam deflection and focusing structure 80, which is known per se.

The high resistive transparent carrier 72 carries on its back side 70 a highly electrically conductive surface layer. For example, this carrier 72 may be comprised of a single crystal type silicon water with an $n^+$ doping near its rear surface. The biasing voltage of the retina 60 is about several volts positive relative to the glow cathode of the beam generator 76 so that the electron beam 78 reaches the retina 60 at a relatively low energy level. The anode voltage at the grid electrode 74 is adjusted to a low dark current in an optimized fashion. A particular beam generator 76 with axis-offset source and thermal screening makes sure that undesired infrared radiation will not reach from that system directly the retina 60.

The object field is situated to the left of the drawing and is not illustrated, and will be imaged by means of a suitable optical system, which is likewise not shown, from the back side upon the retina 60. This system may, for example, have an image rate of 25 images per second, and during such a period a positive charge of the retina is acquired through photo electrone mission which has a strength that is proportional to the radiation intensity from at the individual points. The photo electrons are, so to speak, sucked off the grid-like anode 74.

The electron scanning beam 78 extinguishes any charge in the detector at the rate of the image frequency, and provides to the surface 60 the potential of the glow cathode in 76. This way one obtains a (dielectric) displacement current which is proportional to the charge and flows in the retina 60 in representation of its barrier layer capacity. This current in turn is processed as usual and in a video signal circuit 82, where it is stored and can be read from a monitor, just as is usual in the case of vidicons. The various parameters such as a retina capacity, the retina conductivity, the scanning frequency, the radiation intensity, and the various potentials have to be carefully tuned to each other in order to optimize the detection process. For enhancing the certainty and reliability of operation, it is advisable to increase the natural barrier of the oxide mask 12 by means of special features such as providing a space discharge zone in the semi-conductor substrate.

The preferred embodiment of the invention, the objects and features of the invention, and further objects, features and advantages thereof, will be better understood from the following description taken in connection with the accompanying drawings.

I claim:

1. Infrared detector including a vacuum tube containing an infrared sensitive layer comprising:

a plurality of densely packaged, metallic, electrically conductive needles; and a substrate for supporting said needles so that said needles extend perpendicularly to the substrate, the diameter and the distance of the needles being smaller by about one order of magnitude or more than the wave length of the radiation to be detected.

2. Detector as in claim 1, said substrate being electrically conductive, said needles being in electrically conductive contact with said conductive substrate.

3. Detector as in claim 1, said needles being electrically insulated with respect to said substrate.

4. Detector as in claim 3, said substrate being electrically conductive, there being electrical insulation interposed between the needles and the conductive substrate.

5. Detector as in claim 2 wherein said substrate is transparent to the radiation to be detected, said needles accordingly facing away from said radiation, and means for locally detecting photo field emission from said needles.

6. Detector as in claim 1 wherein said needles are oriented to face incoming radiation, there being means for detecting the photo field emission of at least some of the needles of individual portions of the incoming radiation field.

7. Infrared detector including a vacuum tube with an infrared transparent window further comprising:

a first substrate in said housing;

a plurality of metallic, electrically conducting, thin and densely packed needles extending vertically from said substrate; and means for imaging infrared radiation through said window into said housing.

8. Detector as in claim 7 wherein said substrate is permeable to said radiation, said needles facing away from said window and further including means responsive to electrons produced by photo field emission by said needles for energizing a video screen.

9. Detector as in claim 7, said needles being divided into groups, said substrate including multiple electrically conductive elements insulated from each other and in contact with the respective needle group, the substrate further including a highly electrically insulated substrate, said housing being in its rear portion filled with gas; a counter electrode in said gas-filled portion facing said insulating substrate, said counter electrode being provided on a wall of said housing which is transparent rendering visible any image produced by said counter electrode on account of discharge produced through said gas-filled chamber.

10. Detector as in claim 7 wherein said imaging means includes a scanning system for providing, in a raster or line scan a serial presentation of the infrared radiation to be detected and energizing said needles, there being signal detecting means responsive to photo field emission as serially produced by said needles pursuant to said scan.

11. Detector as in claim 7 wherein said substrate includes an electrically insulating layer in contact with said needles, from which said needles extend, further including a radiation transparent, electrically conducting layer on said transparent insulating substrate and facing said radiation, there being means for electrically biasing said electrically conductive layer; and electron beam scanning means for scanning the needles as facing away from said radiation to produce an image on the basis of capacitive charge induced in said needles, said beam extinguishing the charge.

12. Photo detector as in claim 1, and including a porous oxide layer in said substrate having longitudinal pores, said needles being whiskers which have been electro galvanically grown in said pores and extending out from said oxide layer.

13. Detectors as in claim 12 wherein said needles are in metallic electrically conductive contact with said metallic substrate.

14. Detector as in claim 12 wherein said needles are separated by an oxide skin from said metallic substrate.

15. Detector as in claim 12 wherein said oxide layer is a galvanically grown oxide substrate on a metallic substrate.

16. Infrared detector including a vacuum tube containing an infrared sensitive layer comprising:

a substrate; a porous non-conducting layer on said substrate;

a plurality of densely packaged, metallic, electrically conductive needles contained in the pores, so that said needles are supported for extending perpendicularly to the substrate, the diameter and the distance of the needles being smaller by about one order of magnitude or more than the wave length of the radiation to be detected.

17. Detector as in claim 16, said substrate being electrically conductive, said layer being an anodic oxidation layer, said needles being in electrically conductive contact with said conductive substrate.

18. Detector as in claim 16, said needles being electrically insulated with respect to said substrate being installed, said layer being an anodic oxidation layer.

19. Detector as in claim 16, said needles being electrically conductive whiskers which have been electrolytically grown in said pores, for extending above the porous layer.

* * * * *